United States Patent Office 3,260,681
Patented July 12, 1966

3,260,681
SYNTHETIC ALUMINA, SILICA-ALUMINA HYDROCARBON CRACKING CATALYST AND METHOD FOR HYDROCARBON CRACKING
Robert A. Sanford, Homewood, and Henry Erickson, Park Forest, Ill., assignors to Sinclair Research, Inc., New York, N.Y., a corporation of Delaware
No Drawing. Filed Nov. 4, 1963, Ser. No. 321,348
4 Claims. (Cl. 252—455)

This invention relates to an improved catalyst and its use in cracking hydrocarbons. The new catalyst is made from synthetic silica-alumina hydrogel and synthetic alumina hydrogel. The catalyst components, that is, the silica-alumina and the alumina are prepared separately in hydrogel form and combined before either component is dried to a xerogel. The catalyst is especially useful in converting nickel-contaminated heavier petroleum stocks into gasoline.

It has been noted that synthetic gel silica-alumina cracking catalysts are susceptible to poisoning by small amounts of nickel in the hydrocarbon feedstock undergoing conversion. Such metal poisoning results in a loss of gasoline yield, greater carbon production, greater hydrogen production, and other adverse effects on the cracking process designed to produce gasoline from heavier petroleum hydrocarbons such as gas oils. The catalyst of this invention is significantly improved in its resistance to these poisoning effects of nickel deposited on the catalyst. Among the improvements displayed by the catalyst of this invention over the properties of prior art catalysts are a marked improvement in activity maintenance after exposures of the catalysts to high temperature steam deactivation conditions such as are encountered in cracking processes, considerably lower carbon-producing and gas factors, and enhanced resistance to substantial degradation in product selectivity, e.g., gasoline yield, when poisoned by nickel compounds. Furthermore, from a manufacturing viewpoint, the catalysts of the invention are relatively easy to prepare.

The catalyst of this invention is made by drying to a xerogel a catalyst precursor which is composed of synthetic silica-alumina hydrogel and synthetic alumina hydrogel which have been combined in proportions to give a mixture containing about 46 to 65, preferably about 40 to 55, weight percent alumina on a dry basis, the essential balance being silica. The silica-alumina component of the precursor contains about 65 to 80, preferably about 65 to 75, weight percent silica and about 20 to 35, preferably about 25 to 35 weight percent alumina, all on a dry basis. The separately added alumina hydrogel component, dry basis, of the precursor is about 10 to 50, preferably about 10 to 25, weight percent based on the total of the silica-alumina and alumina components while the silica-alumina content is about 50 to 90 weight percent preferably about 75 to 90 percent. The catalyst can be made by preparing a silica-alumina mixed oxide hydrogel and an alumina hydrogel, followed by the mixing of the two separately prepared, precipitated hydrogels, and thereafter spray drying or drying by other techniques, the catalyst mixture to provide a dried cracking catalyst. The catalyst may be calcined, e.g. at about 800 to 1200° F. or more, to a more active form, but this need not be done since the catalyst is subjected to such temperatures in the cracking operation. It is the usual practice to add the catalyst to the regeneration or carbon burn-off zone of the cracking unit. Also the catalyst may contain minor amounts of other components such as promoters, etc.

Briefly, the cracking catalysts of the invention may be prepared by forming a silica hydrogel by the precipitation of an alkali metal silicate solution with an acid such as sulfuric acid. Then alum solution may be added to the silica hydrogel slurry. The alumina is then precipitated by raising the pH into the alkaline range by the addition of sodium aluminate solution or by the addition of a base such as ammonium hydroxide. The resultant hydrogel slurry may be water washed to remove soduim and sulfate ion by techniques well known in the art. Other techniques for preparing the silica-alumina hydrogels are well known in the art, and these techniques may be used in the practice of the invention.

The alumina hydrogel to be combined with the silica-alumina hydrogel is prepared separately from the silica-alumina hydrogel. The alumina hydrogel may be prepared, for example, by precipitation of alumina at alkaline pH by mixing alum with sodium aluminate in aqueous solution or with a base such as soda ash, ammonia, etc. The alumina hydrogel preferably is filtered prior to its combination with the silica-alumina hydrogel. The alumina hydrogel filter cake preferably is water-washed to remove part or most of its ion content, e.g., sulfate and sodium ion, present in the gel. Thereafter the material is ready for mixing with the silica-alumina hydrogel.

The undried hydrogels are combined, and the combined hydrogels are stirred continuously as an aqueous slurry until a uniform mixing is attained, usually a mixing period in the order of 30–60 minutes being sufficient. The hydrogel slurry may then be partially dewatered for example by filtration to about 8–14% solids in preparation for spray drying, and the combined hydrogels can be spray dried into a microspherical cracking catalyst. The spray dried microspheres may be used in fluid bed cracking processes, or they may be moistened and extruded or pelleted to provide macrosize pills, rods, etc., used in fixed or moving bed cracking processes. If desired, the partially dewatered hydrogels may be extruded or pelleted and then dried, for instance at temperatures of about 230 to 600° F.

The catalyst of the invention is especially useful in the conversion or cracking of normally liquid, heavier hydrocarbons, usually of petroleum origin, to produce lighter or lower boiling products especially gasoline. Typically the feed is a petroleum gas oil and is often a mixture of straight run and recycle gas oils. Since the catalyst is resistant to nickel-poisoning it can be used to crack hydrocarbon stocks which contain soluble or dispersed nickel contaminants. Nickel occurs in natural hydrocarbons as a very minor constituent yet, as well known, its effect on cracking catalysts is economically significant, for instance in terms of gasoline yield, hydrogen production and coke laydown on the catalyst. In present commercial operations the hydrocarbon cracking feeds seldom contain less than say about 0.05 p.p.m. Ni, calculated as NiO. More often this nickel content is at least about 0.1 p.p.m. but usually does not exceed about 0.5 p.p.m. Such feedstocks can be converted when using the catalyst of the present invention but if desired hydrocarbons containing greater amounts of nickel, say up to about 15 or more p.p.m. Ni, calculated as NiO, may be used. Cracking conditions are well known and include temperatures of about 850 to 1050° F., pressures of up to about 100 p.s.i.g., catalyst-to-oil ratios of about 5 to 25:1, and space velocities of about 3 to 60. The reaction is generally conducted in the essential absence of added free hydrogen and the catalyst may be employed as a fluidized bed of small particles or as a fixed or moving bed of larger particles.

It is preferable, when practicing the hydrocarbon cracking process of this invention to conduct the cracking under conditions which minimize the coke content of both the regenerated and spent catalyst. Such a procedure often reduces still further the poisoning effects on the catalyst of the metal contaminants of the hydrocarbon feedstock. Therefore, the cracking system preferably employs conditions which minimize the coke level on the catalyst, for example, by a high rate of catalyst circulation through the reactor and to the regenerator and by an extended regeneration period. Also, steps may be taken to increase the efficiency of steam-stripping of the catalyst before regeneration.

Conventional catalytic conversion systems usually include regeneration procedures in which the catalyst is periodically contacted with free oxygen-containing gas in order to restore or maintain the activity of the catalyst by removing carbon. Conventionally fluid catalyst regenerators process about 5–40 tons of catalyst per minute, using about 2000 to 2800 standard cubic feet of air per ton of catalyst. The average residence time for a quantum of catalyst is often about 3–10 minutes.

In this invention preferred results are obtained when the regenerated catalyst has a carbon content less than about 0.15%, advantageously less than about 0.10%. Also the catalyst in the reactor may be prevented from accumulating more than about 1.0%, advantageously less than about 0.9% carbon. To accomplish this, catalyst may be held in the regenerator for a time generally longer than the conventional procedures by increasing the amount of the catalyst inventory undergoing regeneration at any particular time relative to the rate of catalyst flow. For instance, a quantum of catalyst may remain in the regenerator for longer than 10 minutes, or even up to about 20 or more minutes. Oxygen efficiency may also be kept high in the regenerator by increasing the air rate, for example, to greater than about 3000 standard cubic feet of air per ton of catalyst circulated. Also, the partial pressure of oxygen in the regenerator gas should be kept high and the regeneration temperature may also be increased. In conventional fluid regeneration the oxygen content of the flue gas may be about 0.5–3% while in the preferred process of this invention the flue gas is more likely to contain about 4–5% or more oxygen. Staged regeneration and burning rate promoters may also be employed.

It will be apparent from the following data and examples that the use of a separate alumina hydrogel in the hydrogel mixture used to form the cracking catalysts of the invention substantially enhances the properties of the catalysts in cracking operations.

*Example I*

An alumina hydrogel is prepared as follows:

In a tank containing 5700 gallons of water at 84° F. are dissolved 300 lbs. of soda ash. When the soda ash has been dissolved, 180 gallons of a 39% concentration aqueous sodium aluminate solution are pumped into the tank in about a 15-minute period. The contents of the tank are at about 84° F. Six-hundred gallons of aqueous aluminum sulfate of 7.8% concentration, as $Al_2O_3$, are added to the admixture over an 80-minute period with water of dilution in conjunction with and in addition thereto diluting the reaction mass at a rate of 25 gallons per minute.

The pH of the resulting aqueous reaction mass is adjusted to 8.0 with about 75 gallons of 39% concentration aqueous sodium aluminate solution which, while being added, is also diluted continuously with water at a rate of 35 gallons per minute over a 7½ minute addition period. The contents of the tank are heated to about 100° F. and pumped to storage.

The precipitated, hydrated alumina is thereafter filtered on a large gel filter. The filtered product is partially purified by a one-cycle, water-wash on the filter on which it is collected. This filter is a string vacuum type drum filter with a built-in water spray nozzle directed toward the filter drum. Material on the drum is contacted with water as the drum rotates past the nozzle. After washing, the wet alumina hydrogel is stripped from the drum.

*Example II*

A silica-alumina hydrogel is prepared by the following technique:

To a batch tank is added 4,275 gallons of water preheated to 90° F., and 865 gallons of sodium silicate solution (28.8 weight percent $SiO_2$, 40–41.5 Baumé at 68° F. and $Na_2O:SiO_2$ ratio of 1:3.2) is added. The batch is stirred for five minutes. The concentration of the sodium silicate, as $SiO_2$, in the batch is 6.3 weight percent.

With the batch at 90° F., 302 gallons of 34.5 weight percent sulfuric acid solution at 182° F. are added over a period of 45 minutes. The gel forms about 35 minutes after acid addition is begun. Then the pH is adjusted to 8.0–8.5. The batch is agitated for ten minutes.

Then 715 gallons of alum (7.8 weight percent, as $Al_2O_3$) is added to the gel over a period of about 36 minutes. The batch is agitated for an additional five minutes whereupon 205 gallons of sodium aluminate solution (24.4 weight percent as $Al_2O_3$) diluted in 1080 gallons of water is added over a period of 17 minutes. After all the sodium aluminate is added, the pH is checked. It should be between 5.0 and 5.2. The alumina content of the silica-alumina hydrogel is 30–31%.

*Example III*

The silica-alumina hydrogel product of Example II and 1740 gallons of the alumina hydrogel filter cake of Example I are mixed together for one hour. The finished batch has a pH of 5.5 to 5.6 and a temperature of about 110° F. The aqueous gel mixture is then pumped to a dewatering filter, and the filter cake from said dewatering filter and a portion of aqueous gel are blended to give a gel slurry of about 14 weight percent solids. The hydrogel mixture is spray dried in a spray drier conventionally used in catalyst manufacture. The inlet temperature may be in the order of 420° F. and the outlet temperature may be in the order of 250° F.

After spray-drying the microspherical xerogel particles are purified by using a warm water wash (130–140° F.) and approximately 8 gallons of warm water per pound of the spray dried catalyst, followed by an ammonia treatment. The samples are then dried.

In Table I, below, a comparison is made between a commercially obtained conventional high-alumina synthetic gel silica-alumina cracking catalyst (MA) and a catalyst of this invention (MB). This preparation involved adding to a freshly prepared $SiO_2:30.9\%$ $Al_2O_3$ hydrogel an alumina hydrate containing 53% boehmite of a 33 A.U. crystallite size, the balance being amorphous. The mixture contained 45% alumina on a dry basis. The composite was handled as noted in Example III. Performance data are given for these catalysts in the virgin state, following 24 hours steaming at 1150° F. plus 6 hours 1450° F. steam deactivation and following a 7½ day steam-oil deactivation in a 3 barrel per day pilot plant, operated at 1250° F. regenerator temperature with 1 atmosphere, steam partial pressure (50% steam) in the regenerator. The test cracking procedure included catalytic cracking and catalyst regeneration zones. In the regeneration zone catalyst was regenerated to below about 0.1% carbon.

TABLE I

| Catalyst Sample | MA | MB |
|---|---|---|
| Percent Al₂O₃ | 28.4 | 45.0 |
| N₂ Area, m.²/g | 425 | 510 |
| Total Pore Volume, cc./g | 0.80 | 1.05 |
| Loose Density, g./cc | 0.436 | 0.388 |
| Packed Density, g./cc | 0.476 | 0.422 |
| Attrition loss, percent | 8.1 | 6.1 |
| Test Cracking Steam Deactivated: | | |
|   Relative Activity | 26.7 | 44.8 |
|   Distillate and Loss | 28.4 | 38.0 |
|   Gas Factor | 1.11 | 0.97 |
|   Coke Factor | 1.01 | 0.71 |
|   Gas Gravity | 1.37 | 1.32 |
| Pilot Plant Deactivated: | | |
|   Relative Activity | 43.5 | 53.5 |
|   Distillate and Loss | 37.4 | 41.5 |
|   Gas Factor | 0.94 | 0.92 |
|   Coke Factor | 0.76 | 0.63 |
|   Gas Gravity | 1.40 | 1.34 |
| Physical Characteristics Following Pilot Plant Deactivation: | | |
|   N₂ Area, m.²/g | 174 | 208 |
|   Total Pore Volume, cc./g | 0.65 | 0.91 |
|   Loose Density, g./cc | 0.552 | 0.462 |
|   Packed Density, g./cc | 0.635 | 0.528 |
|   Attrition Loss, Percent | 8.4 | 5.8 |

The data of Table I clearly show the superiority of the new catalyst when compared to a high quality commercial catalyst. Table II below compares the new catalyst MB with samples of other commercially available hydrocarbon cracking catalysts. Sample NA is a low (13.7%) alumina synthetic silica-alumina mixed oxide catalyst made by precipitation of silica and alumina as a mixed-oxide gel, draining off the excess water, grinding to a size suitable for spray-drying, drying and washing of the gel. NB is a high (24.0%) alumina catalyst otherwise similar to NA, NC is a "semi-synthetic" catalyst made by in-situ precipitation of alumina gel on an acid-treated clay catalyst. Table II also includes test cracking data on these catalysts after poisoning the catalysts with nickel by the nickel chelate method, which comprised putting the catalyst into a solution of nickel ethylenediamine-tetraacetate, allowing the catalyst to absorb the solution and then heating to decompose the organic salt.

TABLE II

| Catalyst | NA | | NB | | NC | | MB | |
|---|---|---|---|---|---|---|---|---|
| Test Cracking Virgin: | | | | | | | | |
|   Relative Activity | 134.0 | | 149.0 | | 41.0 | | 141.5 | |
|   D + L | 62.8 | | 65.4 | | 36.2 | | 64.0 | |
|   Gas Factor | 0.77 | | 0.83 | | 1.27 | | 0.91 | |
|   Coke Factor | 0.88 | | 0.98 | | 1.13 | | 0.85 | |
|   Gas Gravity | 1.54 | | 1.46 | | 1.16 | | 1.43 | |
| Steamed 24 hours at 1150° F.: | | | | | | | | |
|   Nickel content (p.p.m.) | | 580 | | 703 | 182 | 656 | | 716 |
|   Relative Activity | 52.8 | 37.5 | 59.4 | 57.0 | 28.6 | 26.3 | 80.3 | 81.6 |
|   D + L | 41.2 | 34.5 | 43.6 | 42.8 | 29.5 | 28.8 | 50.7 | 50.9 |
|   Gas Factor | 0.83 | 1.22 | 0.94 | 1.21 | 1.15 | 1.22 | 0.83 | 0.94 |
|   Coke Factor | 0.72 | 1.19 | 0.78 | 0.95 | 0.82 | 1.03 | 0.68 | 0.81 |
|   Gas Gravity | 1.49 | 1.18 | 1.48 | 1.14 | 1.36 | 1.21 | 1.43 | 1.29 |
| Resteamed 6 hours at 1450° F.: | | | | | | | | |
|   Relative Activity | 16.4 | | 22.3 | | 13.4 | | 44.8 | |
|   D + L | 20.6 | | 25.2 | | 18.3 | | 38.0 | |
|   Gas Factor | 1.19 | | 1.39 | | 1.40 | | 0.97 | |
|   Coke Factor | 1.21 | | 1.18 | | 1.15 | | 0.71 | |
|   Gas Gravity | 1.28 | | 1.36 | | 1.14 | | 1.32 | |

The importance of the alumina content of the silica-alumina mixed-oxide hydrogen component is shown in the examples of Table III. An unwashed SiO₂:5% Al₂O₃ hydrogel was mixed with unwashed alumina hydrogel sufficient to increase the Al₂O₃ content to 25.0%, dried and washed. The product is catalyst DA in Table III. An unwashed SiO₂:15% Al₂O₃ hydrogel was mixed with unwashed alumina hydrogel, dried and washed. The product, containing 39.9% Al₂O₃, is catalyst DB, Table III. An unwashed SiO₂:25% Al₂O₃ hydrogel was mixed with unwashed alumina hydrogel, dried and washed to form catalyst DC, Table III. The final Al₂O₃ content is 48%. It will be noted that about the same amount of alumina was added to each of the catalysts. The enhanced stability due to increasing the Al₂O₃ content of the SiO₂:Al₂O₃ is obvious. The test cracking results reported in Table III were obtained after each catalyst sample had been treated with one atmosphere of steam for 24 hours at 1150° F. and for 6 hours at 1450° F.

TABLE III

| Catalyst | DA | DB | DC |
|---|---|---|---|
| Percent Al₂O₃ in SiO₂:Al₂O₃ hydrogel | 5 | 15 | 25 |
| Percent Al₂O₃ in completed catalyst | 25.0 | 39.9 | 48 |
| Test Cracking: | | | |
|   Relative Activity | 23.4 | 25.4 | 44.8 |
|   D + L | 26.0 | 27.4 | 38.0 |
|   Gas Factor | 1.07 | 1.03 | 0.93 |
|   Coke Factor | 0.85 | 1.01 | 0.68 |
|   Gas Gravity | 1.29 | 1.32 | 1.41 |

The data of Table III show the importance of sufficient alumina in the silica-alumina hydrogel and in the total catalyst composition. Heretofore, when preparing synthetic silica-alumina cracking catalysts it has been considered that the most advantageous catalyst contained 27 to 35% alumina, especially about 30 to 31%, see U.S. Patent 2,872,410; but increasing the alumina content by separate hydrogel addition to a silica-alumina hydrogel in accordance with the present invention significantly enhanced the properties of the catalyst as shown by the data of Table III.

It is claimed:

1. A synthetic catalyst consisting essentially of a dried composite of a catalyst precursor having about 50 to 90% by weight of a silica-alumina hydrogel having a silica content of about 65 to 80% by weight and an alumina content of about 20–35% by weight, mixed with about 10 to 50% by weight of an alumina hydrogel, said amounts being sufficient to provide a total alumina content of the silica-alumina hydrogel-alumina hydrogel precursor of about 40–65%, said percentages being on a dry basis.

2. A synthetic catalyst consisting essentially of a dried composite of a catalyst precursor having about 75 to 90% by weight of a silica-alumina hydrogel having a silica content of about 65 to 75% by weight and an alumina content of about 25–35% by weight mixed with about 10 to 25% by weight of an alumina hydrogel, said amounts being sufficient to provide a total alumina content of the silica-alumina hydrogel-alumina hydrogel precursor of about 40–55%, said percentages being on a dry basis.

3. The catalyst of claim 1 wherein the alumina hydrogel is a mixture of boehmite and amorphous alumina hydrate.

4. The catalyst of claim 2 wherein the alumina hydrogel is a mixture of boehmite and amorphous alumina hydrate.

References Cited by the Examiner

UNITED STATES PATENTS

| 2,850,462 | 9/1958 | Plank | 252—411 |
| 2,933,456 | 4/1960 | Braithwaite | 252—455 |
| 2,935,463 | 5/1960 | Secor et al. | 208—120 |
| 3,173,882 | 3/1965 | Anderson | 208—120 |

DELBERT E. GANTZ, *Primary Examiner.*

ALPHONSO D. SULLIVAN, *Examiner.*

A. RIMENS, *Assistant Examiner.*